(12) United States Patent
Hruska

(10) Patent No.: US 6,481,653 B2
(45) Date of Patent: *Nov. 19, 2002

(54) OPEN THROAT BALE PROCESSOR

(75) Inventor: Kevin Hruska, Saskatchewan (CA)

(73) Assignee: Bridgeview Mfg. Inc. (CA)

( * ) Notice: Subject to any disclaimer, the term of this patent is extended or adjusted under 35 U.S.C. 154(b) by 14 days.

This patent is subject to a terminal disclaimer.

(21) Appl. No.: 09/749,202

(22) Filed: Dec. 27, 2000

(65) Prior Publication Data

US 2001/0008259 A1 Jul. 19, 2001

(30) Foreign Application Priority Data

Jan. 14, 2000 (CA) .............................................. 2295417

(51) Int. Cl.$^7$ ................................................ B02C 13/00

(52) U.S. Cl. ...................... 241/189.1; 241/194; 241/605

(58) Field of Search .............................. 247/189.1, 194, 247/605

(56) References Cited

U.S. PATENT DOCUMENTS

| | | |
|---|---|---|
| 5,601,241 A | 2/1997 | Brewster |
| 5,653,394 A | 8/1997 | Bussiere et al. |
| 5,895,001 A | 4/1999 | Kuelker et al. |
| 6,109,553 A * | 8/2000 | Hruska .................... 241/189.1 |

OTHER PUBLICATIONS

Brandt—Bale Processor; Brandt Industries, Agricultural Division, Canada, 2 pgs.

Delta—Bale Max 3200—Maximize your time and resources; Rem Manufacturing Ltd., Canada, 4 pgs.

Haybuster Bale Buster—For Range or Bunk Feeding, Mulching and Bedding; Haybuster; Duratech; Jamestown, 4 pgs.

* cited by examiner

Primary Examiner—Mark Rosenbaum
(74) Attorney, Agent, or Firm—Killworth, Gottman, Hagan & Schaeff, L.L.P.

(57) ABSTRACT

An open throat crop material processor for disintegrating baled crop material comprises a container having front and back walls and two side walls, a disintegrator and at least two rollers for manipulating the bale mounted within the container in parallel between the front and the back walls and a discharge opening that is at the bottom of the first of the side walls of the container. The sides of the discharge opening are defined by the front and back walls, the bottom of the opening is defined by the second side wall that extends under the disintegrator and the top of the opening is defined by the first side wall that extends down to below one of the manipulator rollers. The crop material processor further includes an elongated baffle located adjacent the disintegrator on the discharge opening side of the processor. The baffles may have a planar or curvilinear surface facing the disintegrator and the ends of the baffle may be fixed to or moveably mounted to the front and the back walls. Hoops that curve over the top of the disintegrator are also mounted between the first and second side walls to support the bale in the container or between the second side wall and the baffle.

19 Claims, 3 Drawing Sheets

OPEN THROAT BALE PROCESSOR

FIELD OF THE INVENTION

The present invention relates generally to baled crop material processors and more particularly to a round bale processor with side discharge.

BACKGROUND OF THE INVENTION

Crop materials, such as straw, hay or other like forage, or animal bedding, are often baled for storage and transportation. It is then necessary to disintegrate the bale in order to spread the crop material for animal bedding or to dispense the crop material as feed.

A typical baled crop material processor for disintegrating bales of crop material machine is described in U.S. Pat. No. 4,830,292 which issued to Frey on May 16, 1989. A baled crop material processor basically comprises a container for receiving the bales, a disintegrator often in the form of a roller with cutters or flails for chopping or shredding the material from the bale, a mechanism including manipulator rollers to direct the bale to the disintegrator and a discharge opening at the side of the processor such that the crop material is discharged from the bail processor. Any number of manipulator rollers are possible, however, the disintegrator is normally located between and below two of the manipulator rollers. The baled crop material is supported and rotated by the rollers. As the crop material bale rotates the disintegrator breaks apart the outer portion of the baled crop material first and then proceeds to break apart the crop material towards the centre of the bale until all of the crop material is disintegrated. As the baled crop material is disintegrated, the loose crop material is driven by the flails to be discharged from the machine through the discharge opening. The discharged crop material may be used as feed in the form of windrows or in feed bunks, or then again as animal bedding which requires that it be scattered.

More recent developments in baled crop material processors are described in Canadian Patent Applications 2,282,334; 2,282,353 and 2,282,895 which were filed on Sep. 17, 1999. These processors include a bale receiving container which has a bottom, a front wall, a back wall, a left side wall and a right side wall. A disintegrator is mounted inside the container for disintegrating the baled crop material and for discharging the disintegrated crop material from the processor. The processor further includes a mechanism for supporting and manipulating the crop material as it is being disintegrated by the disintegrator and an opening at the bottom of one of the side walls through which the disintegrated crop material is discharged.

A problem that sometimes occurs in bale processors is that crop materials may get clogged between the mechanism for manipulating the crop material and the adjacent side wall at the discharge opening. Therefore there is a need for a bale processor that resists such clogging.

SUMMARY OF THE INVENTION

This invention is directed to a processor for disintegrating baled crop material. It comprises front and back walls, and first and second side walls forming a container for receiving a bale. A disintegrator is mounted inside the container and at least two manipulator rollers are also mounted inside the container substantially parallel to the disintegrator with the manipulator roller axes located above the disintegrator. At least one roller is located on each side of the disintegrator.

A discharge opening is located at the bottom of the first side wall which ends below the manipulator, while the second side wall extends down past one of the manipulator rollers under the disintegrator.

In accordance with another aspect of the invention, the disintegrator may comprise a flail roller extending between the front and the back of the container and mounted to rotate about its own longitudinal axis such that the flails drive the bale material along the bottom of the container and out of the discharge opening. The sides of the discharge opening are defined by the front and the back walls, the bottom of the discharge opening is defined by the second side wall and the top of the discharge opening is defined by the first side wall.

Regarding another aspect of the invention, an elongated baffle located adjacent the disintegrator on the side of the container having the discharge opening. The baffle surface facing the disintegrator may be planar or curvilinear. In addition the baffle may be fixed to the front and back walls or moveably mounted on the front and back walls allowing the baffle to be adjusted.

In accordance with another aspect of the present invention, the bale processor further comprises a number of hoops mounted in spaced relationship within the container along the container length and positioned above and substantially perpendicular to axes of the flail roller and the manipulator rollers. The ends of the hoops may be mounted through the first side wall and through the second side wall or one end of the hoops may be mounted through the second side wall while the other ends of the hoops be fixed to the baffle.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

Embodiments of the invention are described in conjunction with the drawings in which.

DETAILED DESCRIPTION OF THE DRAWINGS

Figure 1:
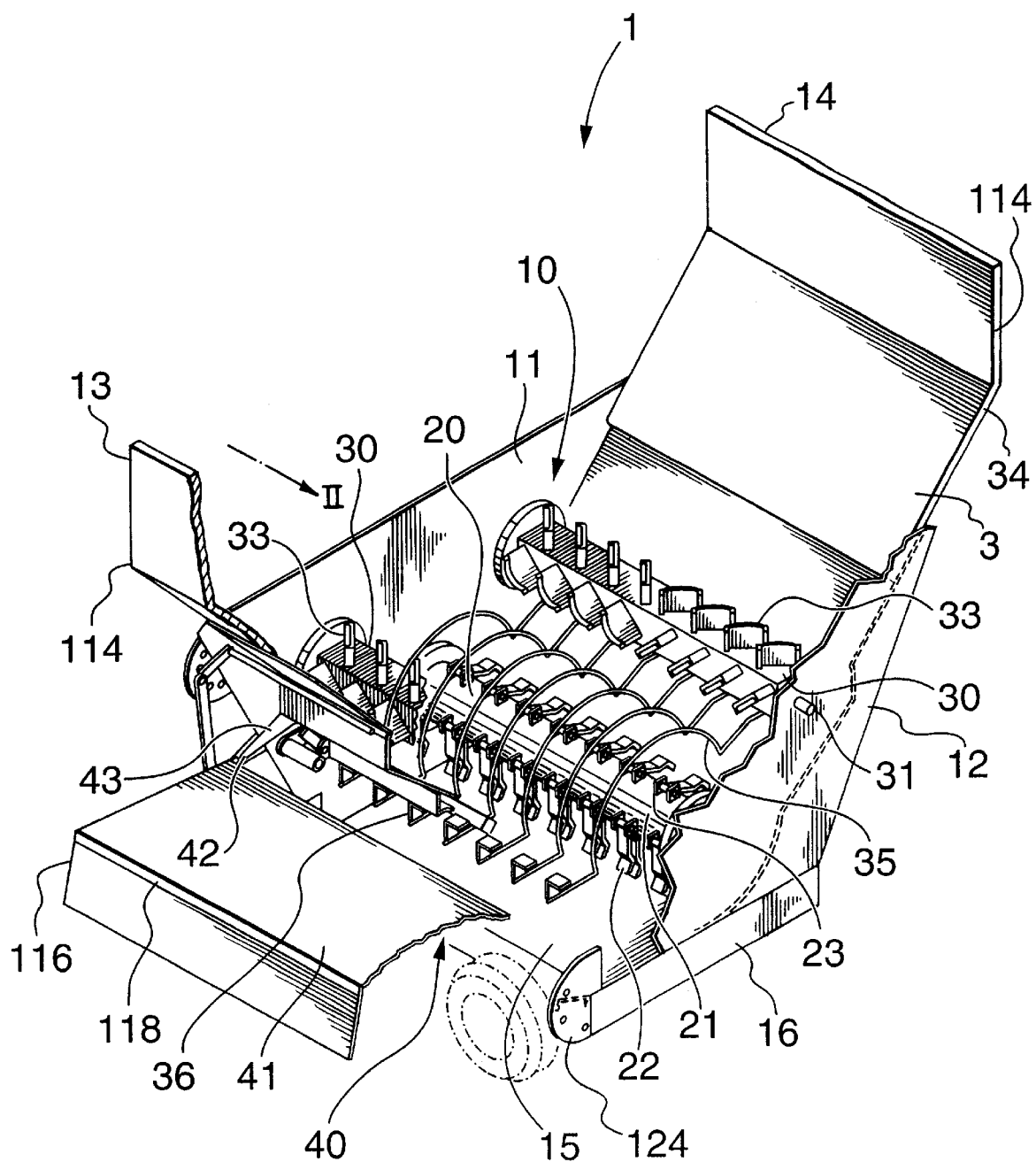
FIG. 1 is an isometric view of an embodiment of the invention.
Figure 2:
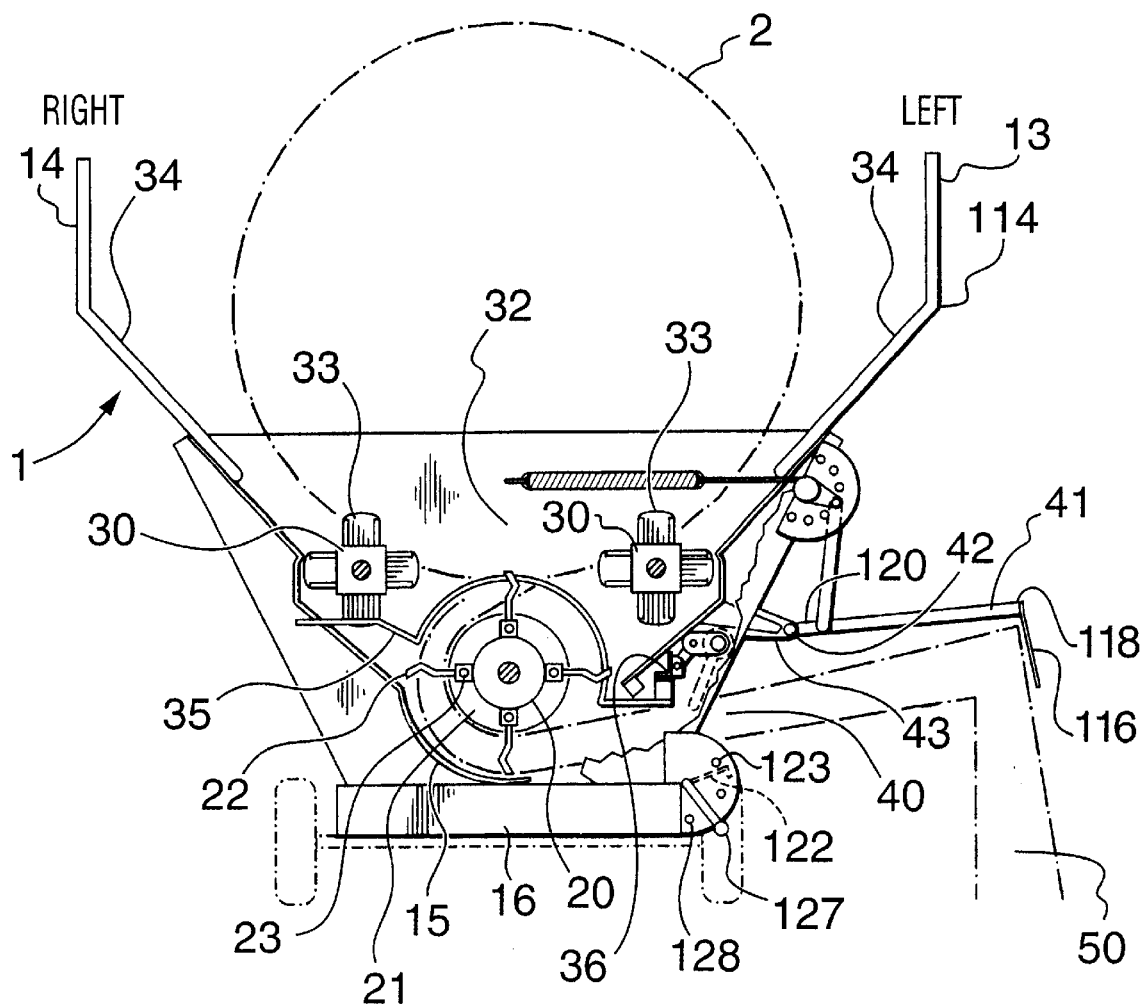
FIG. 2 is a cross-sectional view of the embodiment shown in FIG. 1 taken in the direction indicated by II.

In FIGS. 1 and 2, the baled crop material processors of the type described in the above noted patent applications are used to illustrate the present invention. The baled crop material processor 1 includes a bale container 10 into which bales 2 of crop material are placed as shown schematically in FIG. 2. The container 10 is fixed to a chassis 16. The bale container 10 further has a front wall 11, a back wall 12, first and second side walls 13, 14, where side wall 14 extends as shown at 15 to form the bottom of the container 10.

A disintegrator 20 is mounted within the container 10 parallel to the side walls 13 and 14. The disintegrator 20 includes a flail roller 21 connected to a power take-off coupler located on the container 10 wall 11. The roller 21 rotates about its longitudinal axis. The disintegrator 20 also includes a plurality of flails 22 intermittently spaced circumferentially and longitudinally about the roller 21. The flails 22 extend radially from the flail roller 21 and are connected to the roller 21 by pivots 23.

The bale processor 1 further includes a combination of mechanisms for manipulating the bale and directing it to the disintegrator 20 such that the bale remains generally intact for disintegration primarily by the disintegrator 20. The combination of mechanisms includes at least a pair of rollers 30, each roller 30 mounted parallel to and between the disintegrator 20 and a side wall 13 or 14 respectively. Each roller 30 is also mounted on bearings 31 between the end walls 11 and 12 at a location higher than the disintegrator 20 and near the side wall 13, 14. The rollers 30 in combination with the walls 13, 14 define a support surface on which the bale of crop material is supported. Outside of the container 10 on wall 11, each roller 30 is connected to a hydraulic motor for rotating the roller 30 in either direction as desired by the operator. The rollers 30 further include paddles 33 spaced circumferentially and longitudinally along the rollers 30. The paddles 33 project outwardly from the rollers 30 to grip and rotate the bale. The spacing between the two rollers 30 defines a disintegration opening 32 where the bale encounters the disintegrator 20.

The walls 13 and 14 together with the rollers 30 support the bale within the container 10 as the rollers 30 rotate the bale. While the bale rotates, the rotating flails 22 on the flail roller 20 grasp some of the crop material on the bale, effectively disintegrating the bale. The bottom section 15 of wall 13 extends below the disintegrator 20 to guide the disintegrated bale for discharge through the discharge opening 40. On the other hand, wall 13 extends downward just past the roller 30. Wall 13 is not extended further towards the flail roller 21 in order not to restrict the disintegrator chamber thereby open the throat or the discharge opening 40. The bottom edge of wall 13 defines the top of the discharge opening 40 which is further defined by bottom section 15 of wall 14 and the end walls 11 and 12 through which the flails 22 on the flail roller 20 drive the shredded crop material to discharge it from the processor 1. Thus any material that falls between roller 30 and wall 13 drops into the discharging material 50 and out of the processor 1 precluding clogging at roller 30.

Also mounted inside the container 10 is a series of hoops 35 which prevent the bale or bundles of loose crop material from dropping into the disintegrator 20 all at once. The hoops 35 may be mounted between the sidewalls 13 and 14 of container 10 just below the rollers 30 and are curved upward into the disintegration opening 32 such that they lie between the tips of extended flails 22. Alternately, as illustrated in the drawings, the ends of the hoops 35 at wall 13 may be bolted or welded to a beam 36 which may be raised or lowered to raise or lower the hoops 35 above the disintegration roller 12 as conditions require.

As further illustrated in FIGS. 1 and 2, a discharge door 41 is hinged at 42 to an extension 43 from the side wall 13 such that it may be raised or lowered to guide the shredded bale material as it is discharged. Further, the side wall 13 may extend slightly inward to provide strength and stability to the wall at the level of the inner edge 120 of the discharge door 41. When the outer edge 118 of the discharge door 41 is in the upper position, the discharged material 50 will be spread over a wide area; when the outer edge 118 of the discharge door 41 is in the lower position, the discharged material 50 will form a windrow as the machine 1 moves; and when the outer edge 118 of the discharge door 41 is in an intermediate position, the discharged material 50 can be directed into a feed bunk.

In addition, the discharge door 41 may include a flap 116. The flap 116 is mounted on the distal edge 118 of the discharge door 41 relative to the edge 120 of the discharge door 41 that is pivotally mounted on extensions 43. Preferably, the flap 116 is made of a flexible durable material such as rubber and will help to direct the disintegrated crop material downward.

In addition to the discharge door 41, a deflector 122 may be mounted at the bottom of the discharge opening 40. Deflector 122 is an elongated plate with one edge mounted at each end in flanges 123 and 124 that are fixed to end walls 11 and 12 respectively. Deflector 122 is pivotally mounted such that its outer edge may be raised or lowered to partially deflect the crop material being discharged from the processor 1. A deflector handle 127 is fixed to the deflector 122 to adjust the position of the deflector 122. Handle 127 is spring loaded such that it may be locked into place at any one of a plurality of openings 128 located at discrete locations in flange 123.

A portion 34 of the sidewalls 13, 14 of the container 10 is sloped outwardly from the centre of the container 10, the portion 34 of sloped sidewall 13 has a top edge 114, the width of the container at this point defines the overall width of the processor 1. When the discharge door 41 is in its extreme upper position, it is preferred that it does not extend out further than the top edge 114 of sidewall 13 of the container 10. In this way, the discharge door 41 does not add to the processor 1 width for passing through gates or narrow passages.

Figure 3:
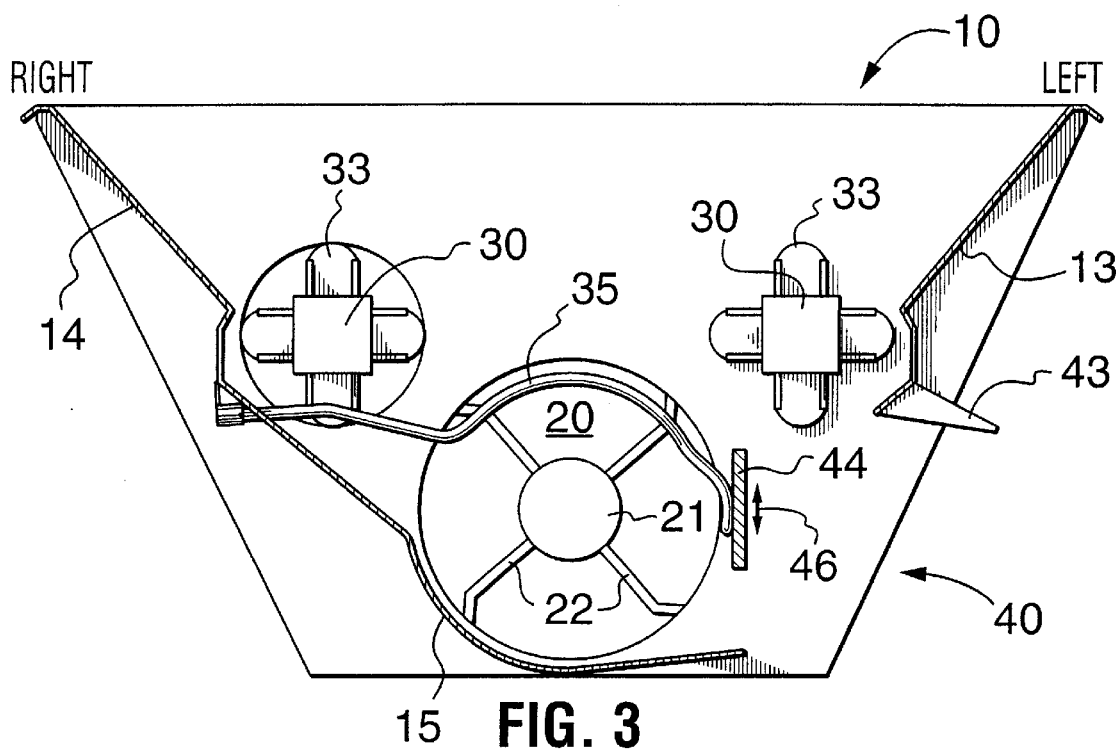
FIG. 3 is a schematic of a left discharge processor with a baffle.
Figure 4:
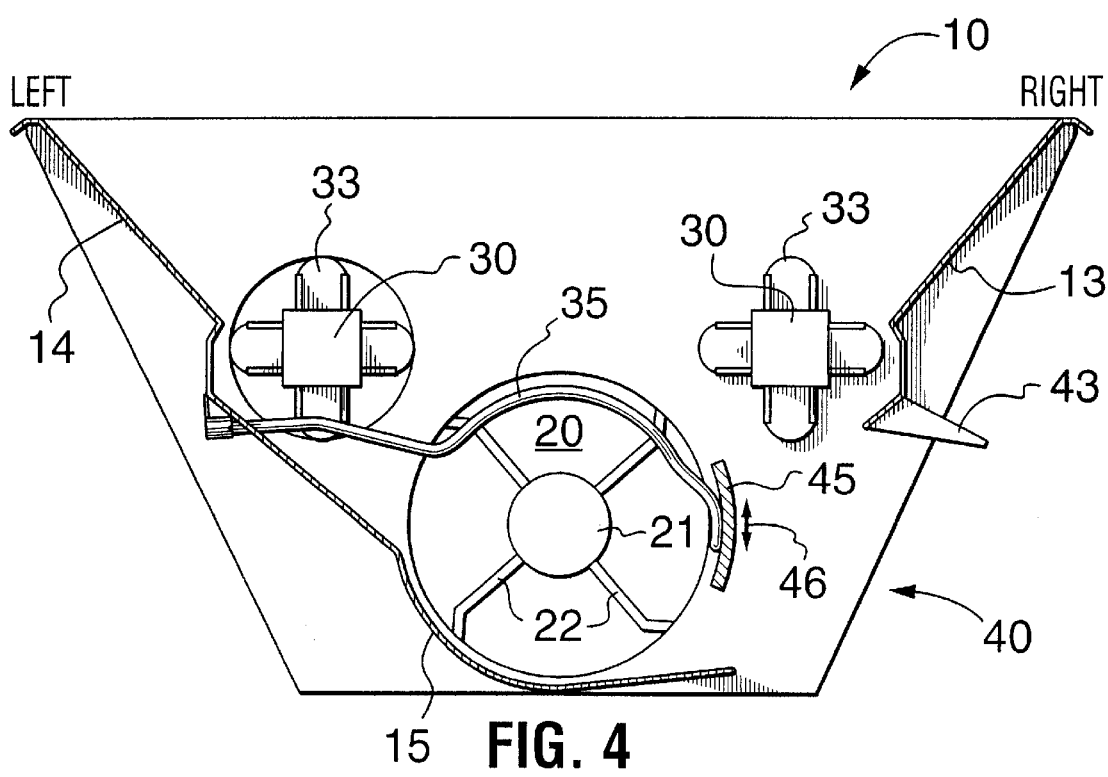
FIG. 4 is a schematic of a right discharge processor with a baffle.

In the embodiment illustrated in FIGS. 1 and 2, the processor is shown as a left hand discharge machine, wherein left and right sides are conventionally identified when looking from the back to the front of a vehicle or implement. Right hand discharge machines are however well within the scope of the present invention. FIGS. 3 and 4 schematically illustrate processors 10 in accordance with the present invention wherein FIG. 3 illustrates a left discharge processor 10 as seen from the front of the processor while FIG. 4 illustrates a right discharge processor as seen from the back of the processor.

In addition, the processors 10 in FIGS. 3 and 4 include an elongated baffle 44 and 45 respectively which is positioned adjacent the disintegrator 20. In the embodiment in FIG. 3, the baffle 44 has a planar surface whereas the baffle 45 has a curvilinear surface adjacent the disintegrator 20 a short distance from the ends of the rotating flails 22. The hoops 35 which are positioned between the flails to help support the bales above the disintegrator 20 may be fixed at one end through the side wall 14 and at the other end by the baffle 44 or 45. The baffles 44 and 45 may be fixed at each end to the end walls 11 and 12, shown in FIG. 1. Alternately, the baffles may be moveably fixed to the end walls 11 and 12 such that the baffles 44 and 45 may be moved vertically. It is often desirable to adjust the hoops upward or downward as shown by arrows 46 to vary the height of the supported bale over the disintegrator 20 so that the length of the disintegrated bale material being discharged from the processor 10 will be appropriate for particular uses.

Many modifications to the above described embodiments of the invention can be carried out without departing from the scope thereof, and therefore the scope of the present invention is intended to be limited only by the appended claims.

What is claimed is:

1. A processor for disintegrating baled crop material comprising:

a container for receiving the baled crop material, the container having a front wall, a back wall, and first and second side walls;

a disintegrator mounted inside the container between the front of the container and the back of the container at least two manipulator rollers rotatably mounted inside the container substantially parallel to the disintegrator with the top of the manipulator rollers being above the top of the disintegrator, wherein at least one roller is located on each side of the disintegrator to define a disintegration opening where crop material is accessed by the disintegrator; and a discharge opening at the bottom of the first side wall, wherein the sides of the discharge opening are defined by the front and the back walls, the bottom of the discharge opening is defined by the second side wall that extends down under the disintegrator and the top of the discharge opening is defined by the first side wall that extends downward just past the manipulator roller.

2. A crop material processor as claimed in claim 1 which further comprises an elongated baffle located adjacent the disintegrator on the discharge opening side of the processor.

3. A crop material processor as claimed in claim 2 wherein the baffle has a planar surface facing the disintegrator.

4. A crop material processor as claimed in claim 2 wherein the baffle has a curvilinear surface facing the disintegrator.

5. A crop material processor as claimed in claim 2 wherein the baffle has ends fixed to the front and the back walls.

6. A crop material processor as claimed in claim 5, further comprising a number of hoops mounted in spaced relationship within the container along the container length and positioned perpendicular and above the disintegrator axis wherein one ends of the hoops are mounted through the second side wall and the other ends of the hoops are fixed to the baffle.

7. A crop material processor as claimed in claim 2 wherein the baffle has ends moveably mounted to the front and the back walls so as to be adjustable.

8. A crop material processor as claimed in claim 7, further comprising a number of hoops mounted in spaced relationship within the container along the container length and positioned perpendicular and above the disintegrator axis wherein one ends of the hoops are mounted through the second side wall and the other ends of the hoops are fixed to the baffle.

9. A crop material processor as claimed in claim 1 wherein the discharge opening is located to the left of the processor.

10. A crop material processor as claimed in claim 1 wherein the discharge opening is located to the right of the processor.

11. A processor for disintegrating baled crop material comprising:

a container for receiving the baled crop material, the container having a front wall, a back wall, and first and second side walls;

a disintegrator mounted inside the container between the front of the container and the back of the container at least two manipulator rollers rotatably mounted inside the container substantially parallel to the disintegrator, wherein at least one roller is located on each side of the disintegrator to define a disintegration opening where crop material is accessed by the disintegrator;

a discharge opening at the bottom of the first side wall, wherein the sides of the discharge opening are defined by the front and the back walls, the bottom of the discharge opening is defined by the second side wall that extends down under the disintegrator and the top of the discharge opening is defined by the first side wall; and an elongated baffle located adjacent the disintegrator on the discharge opening side of the processor.

12. A crop material processor as claimed in claim 11 wherein the baffle has ends fixed to the front and the back walls.

13. A crop material processor as claimed in claim 11 wherein the baffle has ends moveably mounted to the front and the back walls so as to be adjustable.

14. A crop material processor as claimed in claim 12, further comprising a number of hoops mounted in spaced relationship within the container along the container length and positioned perpendicular and above the disintegrator axis wherein one ends of the hoops are mounted through the second side wall and the other ends of the hoops are fixed to the baffle.

15. A crop material processor as claimed in claim 13, further comprising a number of hoops mounted in spaced relationship within the container along the container length and positioned perpendicular and above the disintegrator axis wherein one ends of the hoops are mounted through the second side wall and the other ends of the hoops are fixed to the baffle.

16. A crop material processor as claimed in claim 11 wherein the baffle has a planar surface facing the disintegrator.

17. A crop material processor as claimed in claim 11 wherein the baffle has a curvilinear surface facing the disintegrator.

18. A crop material processor as claimed in claim 11 wherein the discharge opening is located to the left of the processor.

19. A crop material processor as claimed in claim 11 wherein the discharge opening is located to the right of the processor.

* * * * *